US008436891B2

(12) United States Patent
Gefen et al.

(10) Patent No.: US 8,436,891 B2
(45) Date of Patent: May 7, 2013

(54) HYPERLINKED 3D VIDEO INSERTS FOR INTERACTIVE TELEVISION

(75) Inventors: Smadar Gefen, Yardley, PA (US); Gregory House, Doylestown, PA (US); Jay Digiovanni, Voorhees, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 843 days.

(21) Appl. No.: 12/561,105

(22) Filed: Sep. 16, 2009

(65) Prior Publication Data

US 2011/0063415 A1 Mar. 17, 2011

(51) Int. Cl.
*H04N 13/00* (2006.01)

(52) U.S. Cl.
USPC ............ 348/43; 348/46; 348/51; 715/700; 715/716; 715/757; 725/24; 725/37; 725/42; 725/60; 725/61; 725/135; 725/136

(58) Field of Classification Search .......... 725/24, 725/37, 60, 61, 135, 42, 136; 715/700, 716, 715/757; 348/43, 46, 51
See application file for complete search history.

(56) References Cited

U.S. PATENT DOCUMENTS

| 5,264,933 | A  | * | 11/1993 | Rosser et al. ............... 348/578 |
| 5,808,695 | A  |   | 9/1998  | Rosses et al. |
| 6,452,923 | B1 |   | 9/2002  | Gerszberg et al. |
| 6,496,981 | B1 |   | 12/2002 | Wistendahl et al. |
| 6,573,907 | B1 | * | 6/2003  | Madrane ................... 715/719 |
| 7,062,722 | B1 | * | 6/2006  | Carlin et al. ............... 715/850 |
| 7,124,424 | B2 | * | 10/2006 | Gordon et al. ............... 725/43 |
| 7,139,034 | B2 |   | 11/2006 | Kennedy et al. |
| 7,343,617 | B1 |   | 3/2008  | Katcher et al. |
| 7,367,042 | B1 |   | 4/2008  | Dakss et al. |
| 8,086,996 | B2 | * | 12/2011 | Bhogal et al. ............... 717/105 |
| 2002/0054062 | A1 | * | 5/2002 | Gerba et al. ............... 345/716 |
| 2002/0112249 | A1 |   | 8/2002 | Hendricks et al. |
| 2003/0014754 | A1 | * | 1/2003 | Chang ............... 725/60 |
| 2005/0086612 | A1 | * | 4/2005 | Gettman et al. ............... 715/848 |
| 2006/0150212 | A1 | * | 7/2006 | Magnussen et al. ............ 725/32 |
| 2007/0003223 | A1 |   | 1/2007 | Armstrong et al. |
| 2009/0144639 | A1 | * | 6/2009 | Nims et al. ............... 715/757 |
| 2009/0259941 | A1 |   | 10/2009 | Kennedy et al. |
| 2010/0050082 | A1 |   | 2/2010 | Katz et al. |

(Continued)

OTHER PUBLICATIONS

International Search Report with Written Opinion of the International Searching Authority for International Patent Application No. PCT/US10/46630, ISA/US Commissioner of Patents, United States, issued Oct. 13, 2010.

*Primary Examiner* — Michael Won
(74) *Attorney, Agent, or Firm* — Fay Kaplun & Marcin, LLP

(57) ABSTRACT

A viewer may directly interact with a 3D object that is virtually placed in a physical location in a video scene. Initially, the object appears as an integral part of the original video scene and does not interfere with the general viewer's experience of the program. A viewer may initiate interaction with the object using an input device. An interested viewer may navigate through the object's architecture based on the viewer's interest. For example, the viewer may drag the object to a new physical insertion point in the scene. The user may rotate the 3D object into different orientations and zoom in. Each orientation of the object, if selected by the viewer, may invoke a new linked object in the predefined architecture. For example, the viewer may walk through the linked objects in the predefined architecture or observe an object at an increasing level of detail.

40 Claims, 7 Drawing Sheets

U.S. PATENT DOCUMENTS

| | | |
|---|---|---|
| 2010/0138775 A1* | 6/2010 | Kohen et al. .................. 715/781 |
| 2010/0232727 A1* | 9/2010 | Engedal ........................ 382/285 |
| 2010/0251101 A1* | 9/2010 | Haussecker et al. .......... 715/243 |
| 2010/0277468 A1* | 11/2010 | Lefevre et al. ................ 345/419 |
| 2010/0306402 A1* | 12/2010 | Russell et al. ................ 709/231 |
| 2011/0063415 A1* | 3/2011 | Gefen et al. .................... 348/43 |
| 2011/0137753 A1* | 6/2011 | Moehrle ....................... 705/27.1 |
| 2012/0167146 A1* | 6/2012 | Incorvia .......................... 725/60 |

* cited by examiner

HYPERLINKED 3D VIDEO INSERTS FOR INTERACTIVE TELEVISION

BACKGROUND

1. Field

Embodiments of the present invention are applicable to interactive multimedia technology and augmented reality. Although described in embodiments as related to television (e.g., broadcast, cable, satellite, fiber), embodiments may also be applied to other media, such as the Internet and mobile devices (e.g., cellular telephones).

2. Related Art

Television commercials are a major source of income to a broadcaster; therefore, ensuring their effectiveness is imperative to maintain maximum revenue. One way to ensure the effectiveness of a commercial is to require it being watched by a certain number of viewers or certain groups of the population. This is currently being done by commercial scheduling during specific time periods and at channels that target different demographic groups. However, doing so does not guarantee viewer exposure, especially in light of recent technology that allows viewers to avoid the advertising, for example, by fast-forwarding. A measure for viewer attention is required in order to maintain the sales of television advertising time without compromising audience experience.

Interactive digital television is already a common reality, with a growing level of interactivity provided by set-top-box-hosted interactive software applications. Television interactivity presents an opportunity for service providers to obtain an immediate and quantitative feedback on products or services advertised on television directly from the consumer. Interactive applications can be designed to control interaction between television commercials and the viewers. Interactivity may promote the products, indicate the consumers' preferences, and provide the consumers with information, while minimizing interference with the program viewing experience.

Interaction with viewers through overlaid graphics, such as in Video on Demand (VoD) is a commonly accessible technology. Also, hyper-linking in a television broadcast was disclosed by Dakss et al. (U.S. Pat. No. 7,367,042, incorporated herein by reference in its entirety), and others. Dakss et al., for instance, proposes pre-processing the video content, and segmenting the image into predefined regions (products). These regions, when appearing in the video, are highlighted to indicate to the viewer an opportunity for interactivity. At this point, a viewer may press a control button to invoke an annotation tied to the highlighted region and as a result, a graphic with product-related information will be overlaid on the screen. Next, the viewer may choose to make a purchase or request more information. However, this approach to television interactivity directly depends on the original video content, where the object of interest is present at a given location in the scene when the original video is produced.

BRIEF SUMMARY

A method according to an embodiment of the invention allows direct interaction with three-dimensional (3D) objects that are virtually placed in one or more physical locations in the program's scene. The virtual objects are created separately from the original video, and do not appear in the original video. This interaction is controlled by an interactive software application that is running on the receiver and interfacing with the viewer or viewers through one or more input devices. A virtual object may be linked to other virtual objects that are related to each other through a predefined architecture. This architecture may provide a top-level presentation that may be progressed into more detailed/specific presentations of related products and/or services. These objects are inserted into the television program using known video insertion technology. Upon insertion a viewer may choose to interact with an object. This action taken by the viewer and the level of interaction performed can be tracked by the service provider for further analysis.

Initially, virtual objects appear as an integral part of the original production and do not interfere with the general viewers' experience of the program. A viewer may initiate interaction with a virtual object using, for example, a remote control equipped with a mouse-like functionality (e.g. a track-ball or a gyroscopic mouse) or other available means of interfacing with the video. This interaction is direct and intuitive. An interested viewer may navigate through the object's architecture based on the viewer's interest. For example, the viewer may drag an object to a preferable new physical insertion point in the scene. Then, using the mouse rotational movement the viewer may rotate the 3D object into different orientations and zoom in. Each orientation of the object, if selected by the viewer, may invoke a new linked object in the predefined architecture. This paradigm allows walking through the linked objects in the predefined architecture, observing objects at an increasing level of detail, and possibly resulting in a purchase or information inquiry.

Viewer interaction with the proposed hyper-linked 3D objects presents an opportunity to design a richer advertising scheme for products that will be artistically more appealing and entertaining to viewers than traditional overlaid graphics. Although described here in the context of television advertising, hyper-linked 3D objects may be used as an interactive means to convey any sort of information to television audience.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
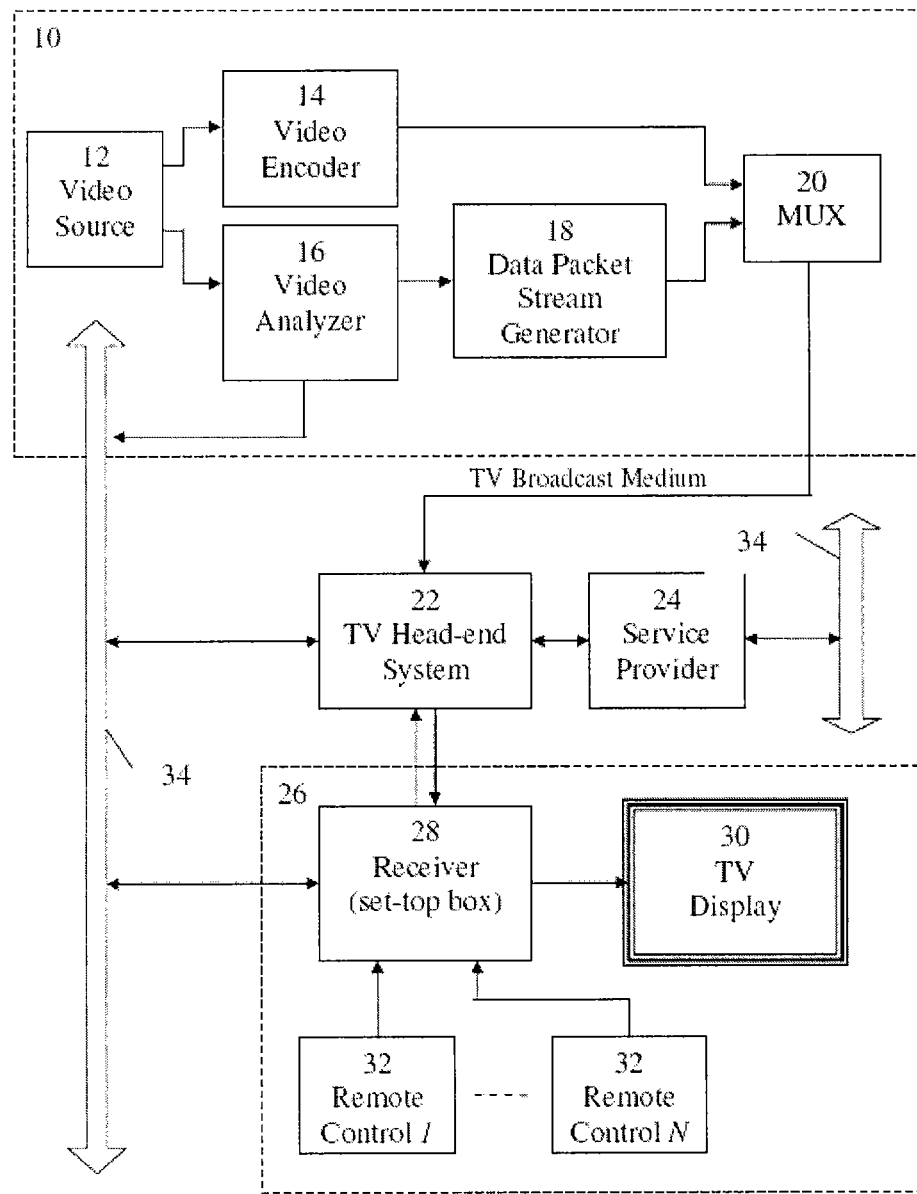
FIG. 1 is an interactive television system according to an embodiment of the present invention.

The present invention will be described with reference to the accompanying drawings.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Augmented reality technology, which is already being used to insert graphics into sporting event broadcasting (e.g., first-down line in football games and sponsors' logos), is instrumental in making television activity more flexible and content independent. In augmented reality, objects are rendered into the video so that they are perceived to be part of the scene. Using video insertion technology may lead to interactivity that is less interfering with program experience, more entertaining, and artistically appealing, thereby more effective for advertisers.

For example, in accordance with embodiments of the present invention, a user may interact with a 3D virtual object added to a physical location in a scene of a video broadcast in a manner that does not interfere with the original broadcast. Initially, the object appears as an integral part of the original video scene and does not interfere with the general viewer's experience of the program. However, because the object was not in the original broadcast, the user can move the object to a location preferred by the user, as well as manipulate the object in various ways. A viewer may initiate interaction with the object using an input device. An interested viewer may navigate through the object's architecture based on the viewer's interest. For example, the viewer may drag the object to a new physical insertion point in the scene. The user may rotate the 3D object into different orientations and zoom in on the object. Each orientation of the object, if selected by the viewer, may invoke a new linked object in the predefined architecture. For example, the viewer may walk through the linked objects in the predefined architecture or observe an object at an increasing level of detail.

Exemplary System

FIG. 1 illustrates an exemplary interactive video broadcast system. The interactive video broadcast system includes a transmission system 10, a head-end system 22, a service provider 24, and a receiving system 26. Transmission system 10, head-end system 22, service provider 24, and receiving system 26 communicate over a television broadcast medium or network 34. Network 34 may be, for example and without limitation, a cable, satellite or terrestrial infrastructure. Although the interactive video broadcast system will be described herein in embodiments as related to television (e.g., broadcast, cable, satellite, fiber), one of skill in the art will also recognize that embodiments may also be applied to other media, such as the Internet and mobile devices (e.g., cellular telephones) without departing from the spirit and scope of the present invention.

Transmission system 10 includes a video source 12, a video encoder 14, a video analyzer 16, a data packet stream generator 18, and a multiplexer 20. Video source 12 emits a video feed, typically a video feed from a content provider. Video source 12 may be any type of video service provider. In examples, video source 12 may be a cable television service provider, a traditional broadcast service provider, an Internet protocol television (IPTV) service provider, an interactive virtual studio service provider, or a mobile phone video service provider. The video feed may be broadcast video or other types of video. It may be part of a live presentation, such as of a sporting event, or it may be pre-recorded as a video file or files on a server or local recording device such as a digital video recorder (e.g., a TIVO recording device available from TiVo, Inc.). The video feed may include video produced by cameras, computer software, graphics generators, or other known methods.

The video feed produced by video source 12 is encoded by video encoder 14 using a standard CODEC such as MPEG2, resulting in a transport stream. The video feed from video source 12 is also fed into video analyzer 16, where insertion related metadata is generated. The metadata may contain data such as the camera model or point of interest position data, etc. Further details regarding generation of insertion related metadata are provided by U.S. patent application Ser. No. 12/424,056 and U.S. patent application Ser. No. 12/541,037, each of which is incorporated herein by reference in its entirety. Video analyzer 16 will be described in further detail with respect to FIG. 2. Data packet stream generator 18 encodes the metadata into a constant data rate stream that is then combined together with the encoded video by the multiplexer 20. The multiplexer's output, an augmented transport stream, is transmitted through TV broadcast medium or network 34 to a broadcasting service provider's head-end 22 in the embodiment of FIG. 1. Broadcasting service provider's head-end 22 receives augmented transport streams as well as transport streams from various content providers (channels). It then redistributes these broadcast channels via network 34 to the consumer's receiving system 26.

Consumer's receiving system 26 includes a receiver 28, a display 30, and one or more input devices 32. Receiver 28 may be, for example and without limitation, a set top box, a mobile telephone, a computing device, or a game console. Display 30 may be, for example, a television, a computer monitor, a projector, an LCD screen, a portable viewing device, a cellular telephone, or another display device known to those of skill in the art. Input device 32 may be a standard remote control, a gyroscopic mouse, or any pointing device.

Figure 5:
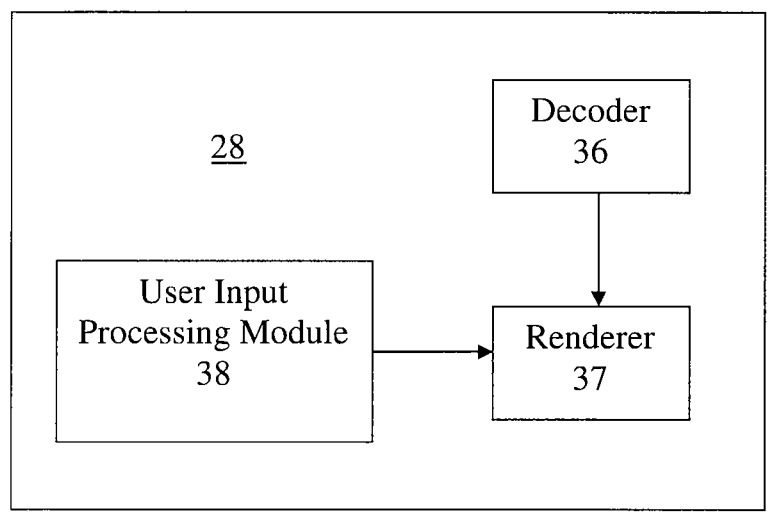
FIG. 5 is a receiver according to an embodiment of the present invention.

At consumer's receiving system 26, the selected broadcast channel is decoded into its components in receiver 28. FIG. 5 is an illustration of an exemplary receiver 28. Exemplary receiver 28 includes a decoder 36, a renderer 37, and a user input processing module 38. The input video stream is buffered while the metadata is processed by the receiver's interactive software application in decoder 36. Based on information stored in the metadata, initial rendering of the virtual objects is performed by renderer 37 and burned into the video frames. Further description of generating and using metadata to insert virtual objects into a video stream is provided in U.S. patent application Ser. No. 12/424,056 and U.S. patent application Ser. No. 12/541,037, each of which is incorporated by reference herein in its entirety. The video frames in which virtual objects are rendered are referred to herein as augmented video frames. The augmented video frames are then sent to display 30.

A watching viewer may choose to interact with virtual objects of interest. Interactions, performed via input device 32 (FIG. 1), are received by user input processing module 38 and responded to by the interactive application using renderer 37. Such response may include rendering of new aspects of the selected virtual object, such as changing the appearance of the selected virtual object, as will be explained in detail below with respect to FIGS. 3 and 4. Viewer interaction operation may also be reported in a back-channel to service provider 24 for analysis.

Figure 2:
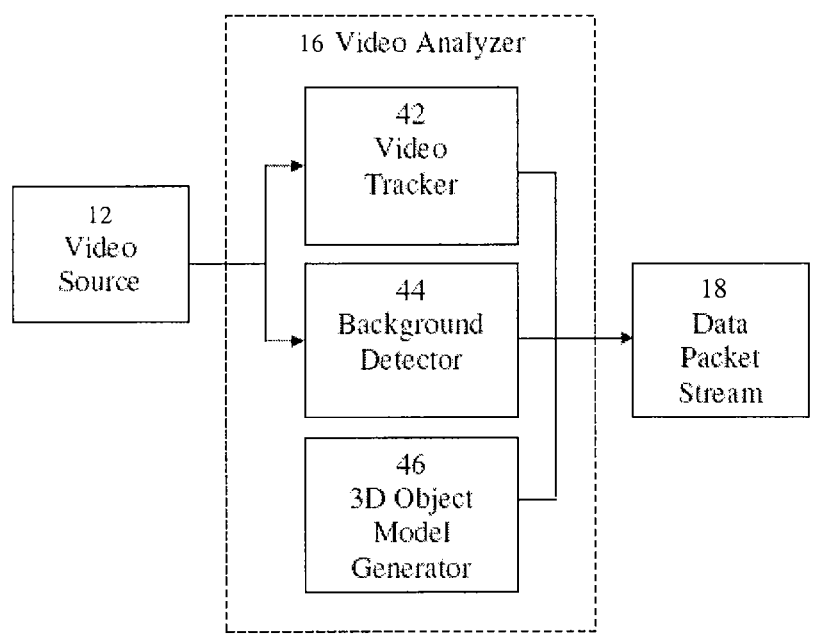
FIG. 2 is a video insertion system according to an embodiment of the present invention.

Video analyzer 16, shown in FIG. 2, includes a video tracker 42, a background detector 44, and a 3D object model generator 46. Video analyzer 16 generates metadata corresponding to each video frame as a data packet stream 18. These metadata include information required by a renderer in the receiver to virtually insert a 3D object into the video frames. The metadata may also contain information related to the initial presentation state of the 3D object such as orientation, dimension, etc.

In such virtual augmentation of the video, the image projection of an object is rendered into the video as if the object was located at a certain physical location at the scene. In order to implement virtual insertion the camera parameters and the scene background for each video frame are required. Video tracker 42 identifies the physical location of the insertion point in each video frame. Methods known in the art for video tracking and object tracking can be used to estimate the camera parameters and track moving objects, respectively, by relating successive frames, for instance. Further details on video tracking and object tracking are provided in U.S. Pat. No. 5,808,695, U.S. patent application Ser. No. 12/424,056, and U.S. patent application Ser. No. 12/403,857, each of which is incorporated by reference herein in its entirety.

Background detector 44 separates the foreground region of a video frame from the background region of the video frame. Methods for separating the foreground and background regions in the video frame are also known in the art. The scene background may be represented by a binary mask that is used to address occlusion. Alternately, a depth map may be provided denoting individual pixels and collections of pixels at various depths. This may enable a rendered virtual object to appear in front of the background and specific objects in the scene, while being behind other objects present in the video scene. Furthermore, the viewer may control the depth of object rendering during the interaction with the virtual object in the scene.

3D object generator 46 is a tool for designing three dimensional models of objects and an architecture through which these objects are conceptually connected to each other. Recent advances in scalable surface modeling (for example, using spherical wavelets) allow for efficient representation and rendering of 3D objects in which an object can be viewed at different orientations and resolution levels. Hence, the objects' 3D models and their architecture combined with the camera parameters and the background mask constitute in part the metadata sent in a data packet stream 18.

The 3D object, generated by 3D object model generator 46, may be represented by a series of still images at slightly different 3D viewing perspective. For example, the original physical object may be placed on a rotating platform, and the series of images may be captured with a camera at different viewing angles as the platform rotates. The effect of 3D viewing of the object may be achieved by allowing the viewer to step through the rotating object views. As seen in FIG. 1, the multiple image views may be sent from head-end system 22 to receiver 28, and displayed on user command of input device 32. Alternately, a true 3D model of the object may be generated from the multiple views, and a true 3D rendering may be realized on the viewing platform. This enables greater control of the viewed objects, at the expense of processing resources for the on-demand rendering.

Returning to FIG. 1, interaction with a 3D object inserted in a television program scene may be direct, using one or more input devices 32. Exemplary input devices include, for example and without limitation, a remote control, a mouse, a keyboard, a game console, a touch screen device, a cellular telephone, a motion sensing device such as a gyroscopic mouse, a WII controller, available from Nintendo Co., Ltd. of Kyoto, Japan, and other devices known to those of skill in the art. Recent developments in the field of gyroscopic mouse allow the viewer to directly and, with pixel-level accuracy, point at an object on the screen and manipulate it from the comfort of the couch.

A cursor is a common method for providing feedback to the user when interacting with objects in a graphical desktop computer environment. The cursor may be used when interacting with virtual objects in a video scene with a dynamic background, as detailed in U.S. Pat. No. 7,139,034, incorporated herein by reference in its entirety. The user feedback mechanism may also be a graphical object, such as a "virtual hand," which may be used to interact with objects in the scene. The cursor may vary according to which of the controllers 32 are active, such as "his" and "her" hands. In another embodiment, complete animated figures may be used to interact with the environment, walking from one location to another as moving around the scene. In a further embodiment, the animated figures may interact with each other, such as exchanging virtual money as is done in "Sim City" gaming applications produced by Electronic Arts Inc. of Redwood City, Calif. Alternately, two viewers at remote locations may interact with the same video scene, and the interaction may be seen at both viewing locations. This may be accompanied by an audio connection between the two viewing locations. In this manner, two viewers may be able to experience joint interaction within the same scene from two remote locations.

Figure 3:
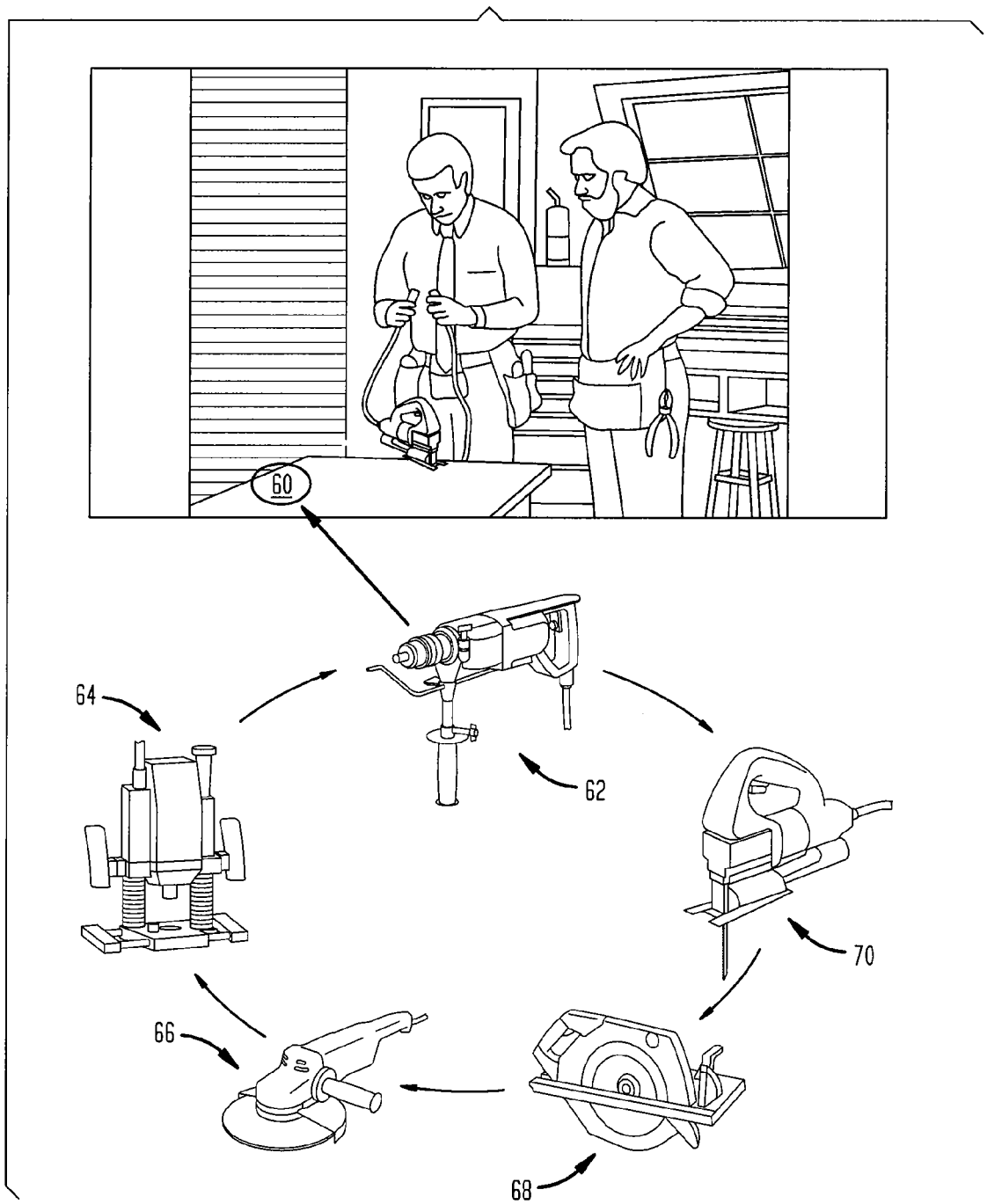
FIG. 3 is an example of viewer interaction with 3D virtual objects connected in cyclic architecture, according to an embodiment of the present invention.
Figure 4:
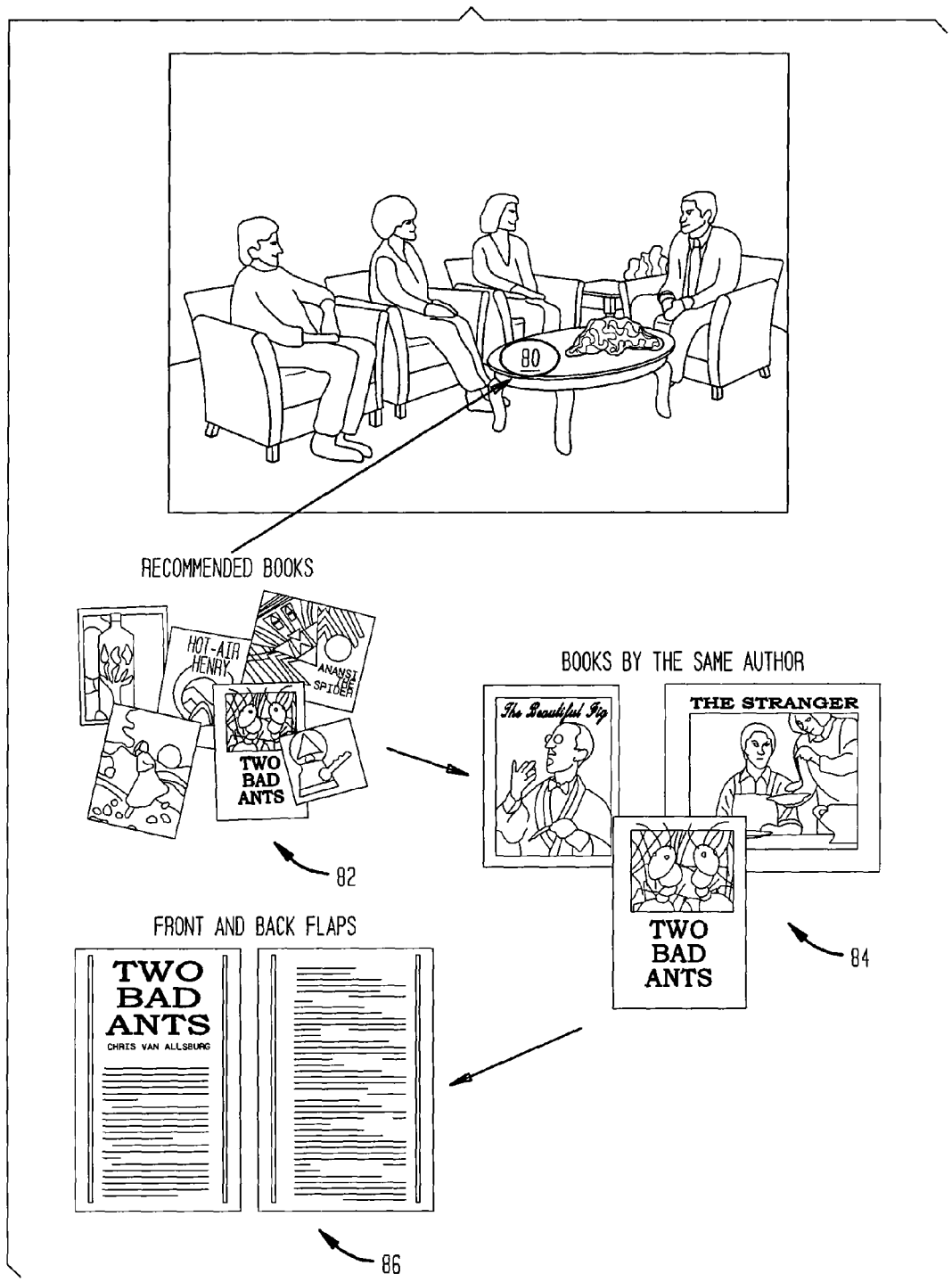
FIG. 4 is an example of viewer interaction with 3D virtual objects connected in tree architecture, according to an embodiment of the present invention.

FIGS. 3 and 4 illustrate exemplary viewer interactivity while watching a video into which a hyperlinked 3D virtual object has been added, according to embodiments of the present invention. Initially, virtual objects appear as an integral part of the original production, and do not interfere with the general viewer's experience of the program. In each example, manipulation of the 3D virtual object by the viewer simulates a virtual reality as if the viewer is present in the scene itself. As such, the manipulation performed by the user does not interfere with the original program, allowing other viewers at the same location to enjoy the original program even if one of the viewers is interacting with the object.

FIG. 3 illustrates exemplary viewer interactivity while watching a home improvement show. A first tool (object) 62 is inserted at a physical scene location 60. The interested viewer may drag this tool to a different insert location, may rotate it to be viewed from different orientations, and zoom in to get a better view of certain parts of it. All this handling of the tool by the viewer simulates a virtual reality as if the viewer is present in the sitcom scene itself.

As shown at the bottom of FIG. 3, more than one tool (objects) may be included in the metadata. In that case, a collection of hyperlinked tools 62-70 are cyclically connected so that a viewer may browse through the tools and each time may interact with another tool. Note that all this interaction may be done concurrently while viewing the program, and may be done by more than one viewer. Alternatively, a viewer may choose to pause the program (e.g., using a digital recording device (DVR)) while investigating an object. In this case, an audio element can be added to the interactivity as well. This has the additional advantage of simplifying the information needed to support the object interaction, as the screen location of hot spots associated with object interaction does not have to update when the video is frozen. In this scenario, it may not be necessary to send tracking information on a field basis; data may be derived for periodic stopping points in the video, and the DVR may stop at the nearest key frame for which data is available.

The display of the examined object may be accompanied by an audio description or discussion about the object. The audio track may contain non-verbal sound effects associated with the object itself, such as connecting the sound of a drill with the animated view of the drill. The sound effects may be implemented in stereo or surround sound to enhance user interest and enjoyment when interacting with the object. In one embodiment, the audio description and associated sounds may be implemented as a "voice over" the current audio track. In another embodiment, the original audio and video is frozen during the examination of the object.

In an embodiment, the audio may be synchronized with the 3D animated display of the virtual object. For example, a viewer may be able to select a character in a sitcom, and a "talking head" of the actor may appear describing information about the character or the particular episode. This interactive track may be provided as a service to viewers much the same way a director "voice over" track may be optionally enabled when viewing a DVD of a movie. In another embodiment, the "talking head" may provide information about the products in the scene or may provide user information about how to navigate the scene. In a further embodiment, the 3D animated object sequence may change with the key pad response of the user interface. For example, an animated display may ask a question of the viewer, and give a follow-up response based on the user input. This application may be appropriate for a children's show, for example, where a preschool student may interact with one or more animated objects, such as a cartoon character in the video scene.

FIG. 4 demonstrates interaction with 3D virtual objects arranged in a tree architecture. A collection of recommended books 82 is inserted into a round-the-table book review show. The interested viewer may interact with each book independently (drag, rotate, and zoom in). Upon interest in a certain book, the viewer may choose to view a collection of recommended or recent books by the same author 84 using the virtual object as a hyperlink. Similarly, further interest in a certain book may show the front and back flaps of book 86. Each item displayed at the different levels of the tree architecture is depicted in a manner so as not to interfere with the original programming.

Recent advances in the LCD technology will allow for readability and legibility of displayed text that is comparable with the e-paper already available in the market. Consequently, 3D objects may embed text such as a table of contents or preface of a book, for example.

A 3D object may also deform into another 3D object, to reveal, for instance, the interior of the object. For example, a viewer may examine one of the 3D tools from FIG. 3 from different perspectives and then click on a hyperlink resulting in deformation of the 3D tool object, revealing a cross section image of it or an internal component. In another example, a viewer may examine a 3D book object, and then click on a hyperlink resulting in deformation of the 3D book object into an opened 3D book object that reveals more information (such as the table of contents).

A 3D object may also be hyperlinked so as to allow a user to purchase the object of interest, or items related to the 3D object. In an embodiment, selecting the object may initiate a purchase transaction. In another embodiment, selecting the 3D object may connect the user to a retailer (e.g., by displaying a retailer website) from which the object can be purchased.

The hyperlink enabled through the interaction with a 3D object may change or vary with the type of object interaction. For example, a simple selection of a 3D object may bring the viewer to a page with a high-level description of the object, and possibly similar products. Alternately, the viewer who examines an object in detailed 3D rotation may be brought to a detailed description or specification of the product. The hyperlink trigger may also be influenced by past history of interactions or possibly a profile constructed from demographic information.

The metadata accompanying the video include initial/default insertion points. As mentioned before, the viewer may change these initial/default insertion points as he or she interacts with the inserted object. An insertion point may be a physical static location in the scene (coming from the background) or a physical dynamic location in the scene (coming from the foreground). For example, the insertion point can be defined at the top of a moving vehicle. In a receiver, for example, objects may be rendered as if they were physically positioned at their current viewer-selected insertion point or the initial/default insertion point attached to it. Alternatively, an object position may be tied to a real-world insertion point or, as dictated by viewer interaction, may be tied to a point in image-space.

If the camera is panning a scene, and the inserted object is moving out of view, the inserted object may be repositioned or reinserted in the scene. In an embodiment, if the object was inserted into the background of a scene that is moving out of view, the object may be repositioned at a different background location in the new scene. In another embodiment, if the viewer is interacting with the object, the object may be moved to the foreground such that panning of the scene by the camera does not affect the location of the object. In an additional embodiment, the video may be frozen during the viewing of the object, allowing full interaction within the scene without concern of the object moving out of view of the video frame.

If the object is inserted into a video stream that may be reprocessed, such as when a DVR is rewound or a video on the Internet is reloaded, the inserted virtual object may appear in the same or a different location as it previously appeared, or the inserted virtual object may be different from a previously inserted virtual object.

In an embodiment, multiple video channels are encoded by video encoder 14 into one bit stream, video analyzer 16 generates metadata with respect to each channel, and data packet stream generator 18 encodes the metadata into a data stream that is then combined together with the encoded multi-channel video by multiplexer 20. In receiver 28, decoder 36 (FIG. 5) decodes a first video channel. A viewer is then presented with a plurality of virtual 3D objects inserted into this currently displayed video channel. Based on the viewer's decision to interact with a selected object, user input processing module 38 instructs decoder 36 to switch to a second video channel with a content that reflects the viewer's interest. This way, a viewer may control the program progression through the choices he or she makes when interacting with certain objects.

Similarly, viewer-controlled content may be achieved with a recorded single-channel video. For example, a pre-recorded program may be composed of an introductory segment, followed by several specialized segments. During the introductory segment the viewer is presented with a plurality of virtual objects. In the case where the viewer chooses not to interact, the program is played sequentially. Otherwise, based on the interest that the viewer demonstrates through interaction, the program may skip to proceed from one of the following specialized segments.

The position of virtual objects in the video stream may vary according to a viewer profile. For example, a type of automobile provided for interaction in the scene may vary according to the expected mean income of the household. Furthermore, the prominence of the interactive objects may vary according to probable demographics and interests of the viewership.

Viewer interaction with the proposed hyperlinked 3D virtual objects presents an opportunity to design a richer advertising scheme for products that will be artistically more appealing and entertaining to viewers than traditional overlaid graphics. Although described here in the context of advertising, hyperlinked 3D virtual objects may be used as an interactive means to convey any sort of information to an audience.

Exemplary Method

Figure 6:
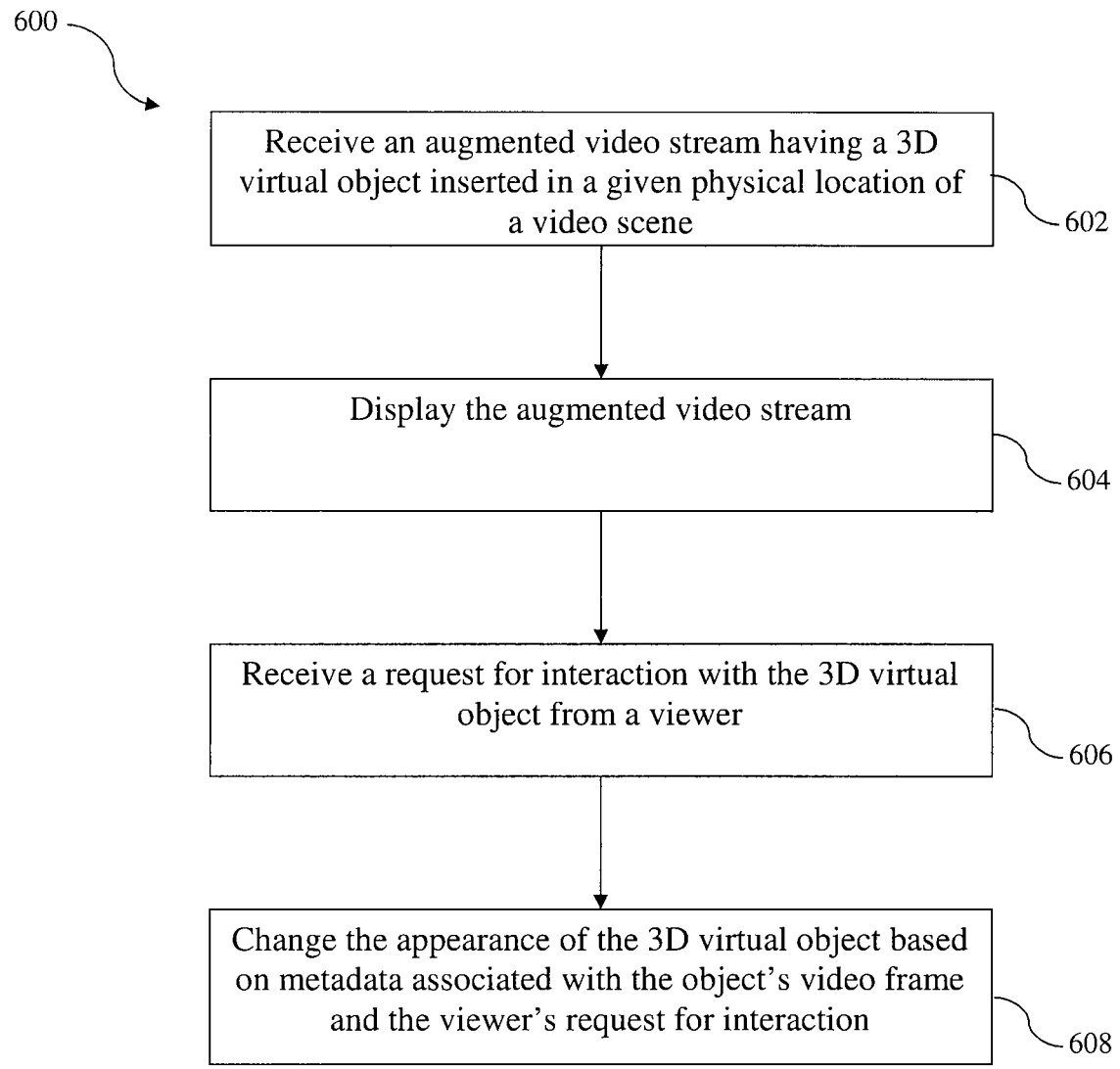
FIG. 6 is a flowchart of a method of viewer interaction with 3D virtual objects inserted into a video broadcast, according to an embodiment of the present invention.

FIG. 6 is a flowchart of a method 600 for allowing interaction with an object in an augmented video stream, according to an embodiment of the present invention.

Method 600 begins at a step 602 when an augmented video stream is received at a user device. As described above, in an embodiment the augmented video stream is received from a broadcasting service provider's head-end system. In an embodiment, the augmented video stream includes an original video stream and metadata corresponding to each frame in the video stream. The original video stream and the metadata may be decoded using, for example, decoder 36 (FIG. 5).

In step 604 of method 600, the augmented video stream is displayed on a user display such as, for example, display 30 of receiving system 26 (FIG. 1). The augmented video stream includes a 3D virtual object inserted in a given physical location of a scene of the video, and may be sent to the user display by a renderer in the receiver, such as renderer 37 (FIG. 5). In an example, the visual element may be a 3D object, and renderer 37 may render the 3D object to appear within the video. This may be achieved by using 3D modeling techniques, including, for example and without limitation, texture loading, virtual camera modeling, and rendering to a view port, such as are widely used in gaming applications.

In step 606, a request for interaction with the virtual object is received from a viewer. The viewer may initiate the request using a user input device, such as input device 32 (FIG. 1). The request may include, among other things, moving the object to a different location in the video scene, changing the spatial orientation of the object, zooming in on the object, and viewing additional objects related through a predefined architecture.

In step 608, the appearance of the virtual object is changed based on metadata associated with the virtual object and the request for interaction from the viewer. In an embodiment, changing the appearance of a given object includes displaying one or more 3D virtual objects that are hyperlinked to the given virtual object. Such additional virtual objects may be displayed cyclically, depending on instructions received from the viewer. In an embodiment, changing the appearance of an object includes revealing the interior of the virtual object (e.g., a cross-section, a cut-away, or interior layer/component of the object) or changing the spatial orientation of the virtual object. In an embodiment, changing the appearance of an object includes displaying additional related objects according to a hierarchical tree structure. In such an embodiment, each level of the hierarchical tree structure may provide more detail about the virtual object than the previous level. Such changes in the appearance of the virtual object may be effected by, for example, renderer 37 (FIG. 5).

Example Computing Device

Figure 7:
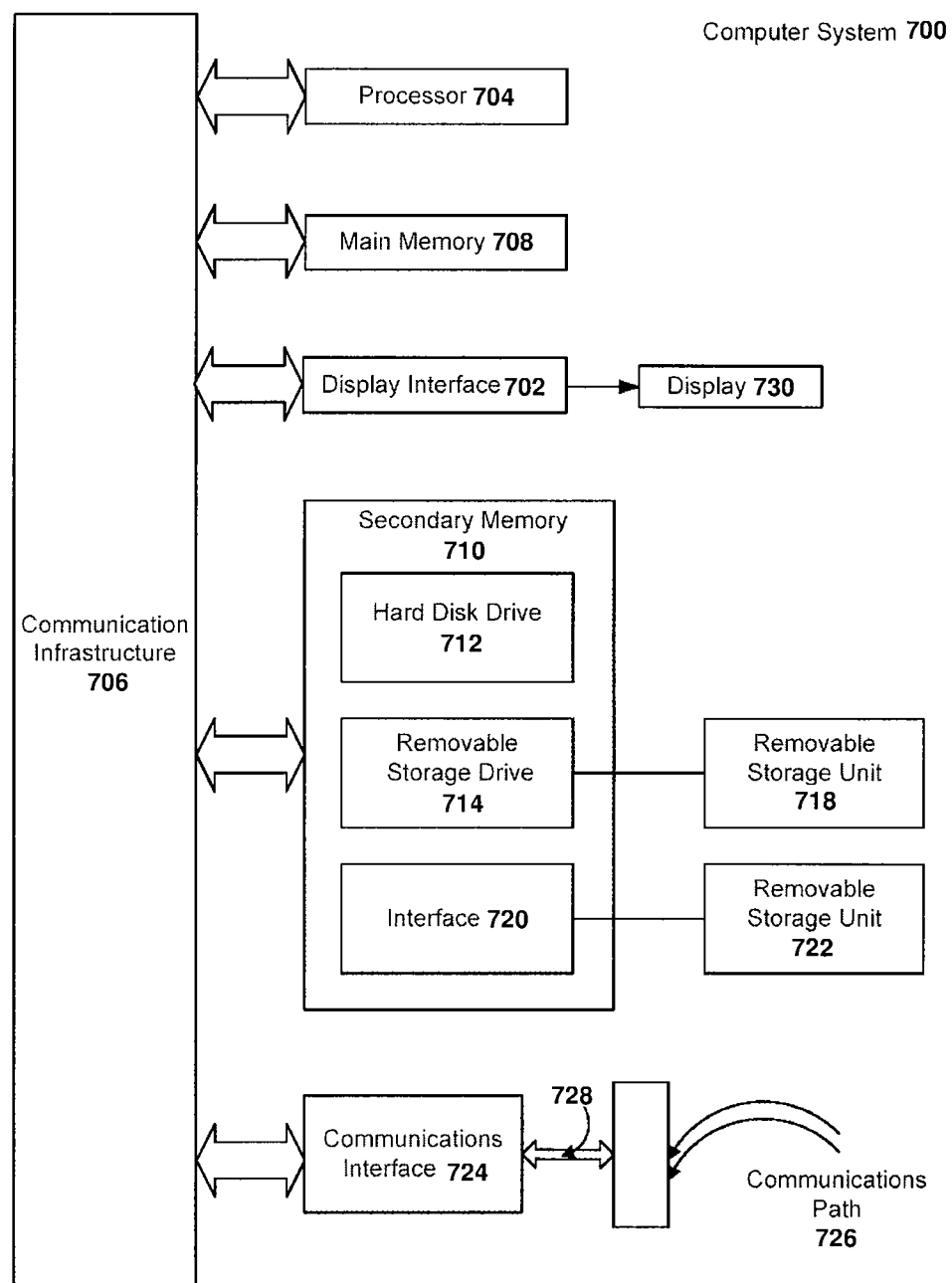
FIG. 7 is a diagram of an example computing device which may be used in embodiments of the present invention.

Although the present invention has been described in embodiments as related to television (e.g., broadcast, cable, satellite, fiber), embodiments may also be applied to other media, such as the Internet and mobile devices (e.g., cellular phone). FIG. 7 is a diagram illustrating an example computing device which may be used in embodiments of this invention. The computing device 700 includes one or more processors, such as processor 704. The processor 704 is connected to a communication infrastructure 706 (e.g., a communications bus, cross over bar, or network). Various software embodiments are described in terms of this exemplary computing device. After reading this description, it will become apparent to a person skilled in the relevant art(s) how to implement the invention using other computing devices and/or architectures.

Computing device 700 can include a display interface 702 that forwards graphics, text, and other data from the communication infrastructure 706 (or from a frame buffer not shown) for display on the display unit 730.

Computing device 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computing device 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computing device 700.

Computing device 700 may also include a communications interface 724. Communications interface 724 allows software and data to be transferred between computing device 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computing device 700. The invention is directed to such computer program products.

Computer programs (also referred to as computer control logic) are stored in main memory 708 and/or secondary memory 710. Computer programs may also be received via communications interface 724. Such computer programs, when executed, enable the computing device 700 to perform the features of the present invention, as discussed herein. In particular, the computer programs, when executed, enable the processor 704 to perform the features of the present invention. Accordingly, such computer programs represent controllers of the computing device 700.

In an embodiment where the invention is implemented using software, the software may be stored in a computer program product and loaded into computing device 700 using removable storage drive 714, hard disk drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for interacting with a virtual object in an augmented video stream, comprising:
    displaying an augmented video stream having a three-dimensional virtual object inserted in a given physical location of a video scene;
    receiving a request for interaction with the virtual object from a viewer;
    changing the appearance of the virtual object at the given physical location based on metadata associated with the virtual object and the request for interaction from the viewer, wherein the changing the appearance includes switching from a first predetermined metadata representing the virtual object to a second predetermined metadata representing a different virtual object.

2. The method of claim 1, wherein changing the appearance of the virtual object comprises displaying a plurality of three-dimensional virtual objects that are hyperlinked to each other.

3. The method of claim 2, wherein objects in the plurality of virtual objects are linked and displayed according to a predefined architecture.

4. The method of claim 3, wherein each object in the plurality of virtual objects is displayed cyclically upon receipt of instructions from the viewer.

5. The method of claim 3, wherein objects in the plurality of virtual objects are displayed according to a hierarchical tree structure, wherein each level of the hierarchical tree structure provides more detail about the virtual object than the previous level.

6. The method of claim 2, wherein the hyperlinks vary according to at least one of an interaction history of the viewer and demographic information of the viewer.

7. The method of claim 1, wherein changing the appearance of the virtual object comprises moving the location of the virtual object in the video scene from the given physical location to an alternate physical location in the video scene selected by the viewer.

8. The method of claim 7, wherein the alternate physical location is a static location in the background of the video scene.

9. The method of claim 7, wherein the alternate physical location is a dynamic location in the foreground of the video scene.

10. The method of claim 1, wherein changing the appearance of the virtual object comprises revealing the interior of the virtual object.

11. The method of claim 1, wherein changing the appearance of the virtual object comprises changing a spatial orientation of the virtual object.

12. The method of claim 1, wherein the virtual object is an animated object.

13. The method of claim 12, wherein changing the appearance of the virtual object comprises changing an animation sequence of the object.

14. The method of claim 1, wherein receiving a request for interaction with the virtual object comprises receiving a request generated by direct manipulation of the virtual object at the screen by at least one of dragging, clicking, or rotational movements.

15. The method of claim 1, wherein receiving a request for interaction with the virtual object comprises receiving information generated when a control button available on a remote control is activated.

16. The method of claim 1, wherein receiving a request for interaction with the virtual object comprises receiving a request to pause the video.

17. The method of claim 1, wherein receiving a request for interaction with the virtual object comprises receiving a request to invoke an audio track related to the selected virtual object.

18. The method of claim 17, further comprising playing the audio track in at least one of stereo or surround sound.

19. A system for enabling interaction with an object in an augmented video stream, comprising:
   a decoder configured to receive a video stream and metadata associated with frames in the video stream;
   a renderer configured to insert a three-dimensional virtual object into frames of the video stream at a given physical location of a video scene and change the appearance of the virtual object at the given location based on the metadata and a request for interaction with the virtual object from a viewer, wherein the renderer changes the appearance of the virtual object by switching from a first predetermined metadata representing the virtual object to a second predetermined metadata representing a different virtual object; and
   a user input processing device configured to receive the request for interaction with the virtual object from the viewer.

20. The system of claim 19, wherein the renderer is further configured to change the appearance of the virtual object by hyperlinking to a plurality of virtual three-dimensional objects to the virtual object.

21. The system of claim 20, wherein the renderer is further configured to insert each object in the plurality of virtual objects according to a predefined architecture upon receipt of instructions from the viewer.

22. The system of claim 21, wherein the renderer is further configured to insert each object in the plurality of virtual objects in a cyclical order upon receipt of instructions from the viewer.

23. The system of claim 21, wherein the renderer is further configured to insert each object in the plurality of virtual objects according to a hierarchical tree structure, wherein each level of the hierarchical tree structure provides more detail about the virtual object than the previous level.

24. The system of claim 19, wherein the renderer is further configured to change the appearance of the virtual object by inserting the virtual object in the video scene at an alternate location in the video scene that is different from the given physical location.

25. The system of claim 24, wherein the alternate location is a static location in the background of the video scene.

26. The system of claim 24, wherein the alternate location is a dynamic location in the foreground of the video scene.

27. The system of claim 19, wherein the renderer is further configured to change the appearance of the virtual object by revealing the interior of the virtual object.

28. The system of claim 19, wherein the renderer is further configured to change the appearance of the virtual object by changing a spatial orientation of the virtual object.

29. The system of claim 19, wherein the renderer is further configured to insert the three-dimensional virtual object as an animated object.

30. The system of claim 19, wherein the user input processing module is further configured to pause the video.

31. The system of claim 19, wherein the user input processing module is further configured to invoke an audio track related to the selected virtual object.

32. A system for enabling interaction with an object in an augmented video stream, comprising:
   a video tracker configured to identify a physical location at which a three-dimensional object is virtually inserted into a video frame;
   a background detector configured to separate the foreground region of the video frame from the background region of the video frame;
   a three-dimensional object generator configured to generate three-dimensional models of objects and an architecture through which the objects are conceptually connected to each other, wherein the three-dimensional object generator changes the appearance of the three-dimensional object by switching from a first predetermined metadata representing the three-dimensional object to a second predetermined metadata representing a different three-dimensional object.

33. The system of claim 32, further comprising: a data stream generator configured to combine the outputs of the video tracker, the background detector, and the three-dimensional object generator as metadata.

34. The system of claim 32, wherein the architecture designed by the three-dimensional object generator is a tree architecture in which each object is a more detailed version of the previous object.

35. The system of claim 32, wherein the architecture designed by the three-dimensional object generator is a cyclical architecture in which each object is of a similar type.

36. The system of claim 32, wherein at least one of the three-dimensional models of an object is an interior model of the object.

37. A method for interacting with a virtual object in an augmented video stream, comprising:
   displaying an augmented video stream having a plurality of three-dimensional virtual objects inserted in a video scene;
   receiving a request for interaction with a particular virtual object in the plurality of virtual objects from a viewer; and
   changing the displayed video stream based on the request for interaction with the particular virtual object by switching from a first predetermined metadata representing the particular virtual object to a second predetermined metadata representing a different virtual object.

38. The method of claim 37, wherein changing the displayed video stream comprises displaying another video stream having content associated with the particular virtual object.

39. The method of claim 38, wherein the augmented video stream is received on a first channel and the other video stream is received on a second channel.

40. The method of claim 37, wherein the augmented video stream includes an introductory segment and a plurality of specialized segments, the plurality of three-dimensional virtual objects being inserted during the introductory segment, and wherein changing the displayed video stream comprises displaying at least one of the specialized segments in the plurality of specialized segments based on the request for interaction.

* * * * *